(12) United States Patent
Maeda et al.

(10) Patent No.: US 12,480,177 B2
(45) Date of Patent: Nov. 25, 2025

(54) GALVANIZED STEEL SHEET AND METHOD FOR PRODUCING SAME

(71) Applicant: JFE STEEL CORPORATION, Tokyo (JP)

(72) Inventors: Satoshi Maeda, Tokyo (JP); Nao Kawabe, Tokyo (JP); Hiromi Yoshitomi, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 14 days.

(21) Appl. No.: 18/548,970

(22) PCT Filed: Feb. 25, 2022

(86) PCT No.: PCT/JP2022/008095
§ 371 (c)(1),
(2) Date: Sep. 5, 2023

(87) PCT Pub. No.: WO2022/202108
PCT Pub. Date: Sep. 29, 2022

(65) Prior Publication Data
US 2024/0150864 A1 May 9, 2024

(30) Foreign Application Priority Data
Mar. 24, 2021 (JP) .................... 2021-050821

(51) Int. Cl.
| | | |
|---|---|---|
| *B32B 15/01* | (2006.01) | |
| *C21D 1/76* | (2006.01) | |
| *C21D 6/00* | (2006.01) | |
| *C21D 8/02* | (2006.01) | |
| *C21D 9/46* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/08* | (2006.01) | |
| *C22C 38/12* | (2006.01) | |
| *C22C 38/14* | (2006.01) | |
| *C22C 38/16* | (2006.01) | |
| *C22C 38/26* | (2006.01) | |
| *C22C 38/28* | (2006.01) | |
| *C22C 38/38* | (2006.01) | |
| *C22C 38/60* | (2006.01) | |
| *C23C 2/02* | (2006.01) | |
| *C23C 2/26* | (2006.01) | |
| *C23C 2/06* | (2006.01) | |
| *C23C 2/28* | (2006.01) | |

(52) U.S. Cl.
CPC .............. *C21D 9/46* (2013.01); *B32B 15/013* (2013.01); *C21D 1/76* (2013.01); *C21D 6/001* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 8/0278* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/26* (2013.01); *C22C 38/28* (2013.01); *C22C 38/38* (2013.01); *C22C 38/60* (2013.01); *C23C 2/02* (2013.01); *C23C 2/26* (2013.01); *C23C 2/06* (2013.01); *C23C 2/285* (2013.01)

(58) Field of Classification Search
None
See application file for complete search history.

(56) References Cited

U.S. PATENT DOCUMENTS

| | | | |
|---|---|---|---|
| 10,526,690 B2 * | 1/2020 | Yamanaka | ........... C21D 8/0478 |
| 2016/0214351 A1 | 7/2016 | Harako et al. | |
| 2020/0190617 A1 * | 6/2020 | Hasegawa | .............. C21D 6/005 |
| 2020/0291499 A1 | 9/2020 | Yoshitomi et al. | |
| 2020/0377978 A1 | 12/2020 | Yoshitomi et al. | |
| 2021/0010100 A1 | 1/2021 | Maeda et al. | |
| 2021/0010115 A1 | 1/2021 | Yoshitomi et al. | |
| 2021/0115529 A1 | 4/2021 | Yoshitomi et al. | |
| 2021/0230712 A1 | 7/2021 | Yokoyama et al. | |

FOREIGN PATENT DOCUMENTS

| | | |
|---|---|---|
| CN | 110121568 A | 8/2019 |
| CN | 111386358 A | 7/2020 |
| EP | 3550050 A1 | 10/2019 |
| EP | 3564400 A1 | 11/2019 |
| EP | 3719156 A1 | 10/2020 |

(Continued)

OTHER PUBLICATIONS

May 10, 2022, International Search Report issued in the International Patent Application No. PCT/JP2022/008095.

Lewis J. Berry et al., Understanding the role of snout contamination in the formation of an oxide based defect in hot dip galvanised coating, Surface & Coatings Technology, 2016, pp. 397-407, vol. 306.

(Continued)

Primary Examiner — Daniel J. Schleis
(74) Attorney, Agent, or Firm — KENJA IP LAW PC

(57) ABSTRACT

To provide a galvanized steel sheet having high strength; specifically, with a tensile strength of 1160 MPa or more and excellent resistance spot weldability. A chemical composition of a base steel sheet contains one or more of Ti, Nb, V, and Zr: 0.02% or more and 0.20% or less in total, and an amount of diffusible hydrogen in a zinc or zinc alloy coating layer is 0.40 mass ppm or less.

12 Claims, No Drawings

(56) References Cited

FOREIGN PATENT DOCUMENTS

| | | | |
|---|---|---|---|
| EP | 3719157 A1 | 10/2020 | |
| JP | 2011111671 A | 6/2011 | |
| JP | 5413330 B2 | 2/2014 | |
| KR | 1020150075564 A | 7/2015 | |
| KR | 1020160048882 A | 5/2016 | |
| KR | 2016072898 A * | 6/2016 | |
| KR | 1020160072898 A | 6/2016 | |
| KR | 1020200124740 A | 11/2020 | |
| KR | 1020200127216 A | 11/2020 | |
| WO | WO-2018124157 A1 * | 7/2018 | ............... C21D 1/32 |
| WO | 2019106895 A1 | 6/2019 | |
| WO | 2019189849 A1 | 10/2019 | |
| WO | 2019212047 A1 | 11/2019 | |

OTHER PUBLICATIONS

Sep. 25, 2024, the Extended European Search Report issued by the European Patent Office in the corresponding European Patent Application No. 22774906.6.

Apr. 15, 2025, Office Action issued by the Korean Intellectual Property Office in the corresponding Korean Patent Application No. 10-2023-7030109 with English language concise statement of relevance.

May 27, 2025, Office Action issued by the China National Intellectual Property Administration in the corresponding Chinese Patent Application No. 202280023055.7 with English language search report.

* cited by examiner

GALVANIZED STEEL SHEET AND METHOD FOR PRODUCING SAME

TECHNICAL FIELD

The present disclosure relates to a galvanized steel sheet and a method of producing the same.

BACKGROUND

In recent years, enhancement of fuel efficiency of automobiles has become an important issue from a viewpoint of global environment protection. Therefore, there is a growing trend to reduce a weight of automotive bodies by increasing a strength of and reducing a thickness of steel sheets which are used as a material of automotive parts. From a viewpoint of rust resistance performance of an automotive body, steel sheets, which are used as the material for automotive parts, are sometimes subjected to galvanization. Therefore, there is a need to develop a galvanized steel sheet with high strength.

As a technology relating to steel sheets and galvanized steel sheets with such high strength, JP 2011-111671 A (PTL 1), for example, describes: "A high strength steel sheet having a maximum tensile strength of 900 MPa or more with good ductility and delayed fracture resistance, comprising: a chemical composition containing in mass %, C: 0.07% to 0.25%, Si: 0.3% to 2.50%, Mn: 1.5% to 3.0%, Ti: 0.005% to 0.09%, B: 0.0001% to 0.01%, P: 0.001% to 0.03%, S: 0.0001% to 0.01%, Al: 2.5% or less, N: 0.0005% to 0.0100%, and O: 0.0005% to 0.007%, in total with a balance being Fe and inevitable impurities; a steel sheet microstructure composed mainly of ferrite and containing martensite composed of block sizes of 1 µm or less, with a ferrite volume fraction of 60% or more and a C concentration in martensite of 0.3% to 0.9%, wherein the yield ratio (YR), which is a ratio of maximum tensile strength (TS) to yield stress (YS), is 0.75 or less".

In addition, JP 5413330 B (PTL 2) describes:
"A steel sheet for use in a hot press, comprising: a chemical composition containing in mass %, C: 0.1% to 0.5%, Si: 0.05% to 2%, Mn: 0.1% to 3%, and any one or more of Ti: 0.005% to 1%, Nb: 0.01% to 1%, V: 0.01% to 1%, Mo: 0.01% to 1%, W: 0.005% to 1%, Cu: 0.01% to 3%, Zr: 0.005% to 0.1%, Y: 0.005% to 0.5%, Mg: 0.005% to 1%, La: 0.005% to 0.1%, Ce: 0.005% to 0.1%, wherein a steel sheet surface is covered with a coating composed mainly of Aluminum or zinc, and an amount of hydrogen in the steel sheet satisfies the below-described (Formula 1).

Hmax−Ht≥0.07 ppm     (Formula 1)

where Hmax is a maximum amount (ppm) of non-diffusible hydrogen that the steel sheet can trap, and Ht is an amount (ppm) of non-diffusible hydrogen that is trapped in the steel sheet after coating."

CITATION LIST

Patent Literature

PTL 1: JP 2011-111671 A
PTL 2: JP 5413330 B

SUMMARY

Technical Problem

When assembling automobiles, two or more overlapping steel sheets (hereinafter referred to as sheet combination) are often joined by resistance spot welding due to cost and efficiency.

Resistance spot welding is a method in which pressure is applied to two or more overlapping steel sheets by a pair of electrodes from above and below, while passing a high welding current between the upper and lower electrodes for a short time to join the steel sheets. Heat generated from a resistance to a flow of the high welding current is used to obtain a spot welded portion. This spot welded portion is called a nugget. The nugget is a portion where the steel sheets melt and solidify against each other at contact points of the steel sheets, which make up the sheet combination, when the electric current is applied to the sheet combination. The steel sheets are spot-joined by the nugget.

In an actual implementation of resistance spot welding, a nugget diameter may be smaller than usual due to inevitable changes in welding conditions, such as an accuracy of a sheet and a degree of adhesion through the sheet.

However, when resistance spot welding is performed under conditions where the nugget diameter becomes small, cracks occur near edges of the nugget in the case where a galvanized steel sheet, in which the steel sheet described in PTL 1 is used as the base steel sheet, or the galvanized steel sheet described in PTL 2 is included in the sheet combination. The cracking may then become an initiation point leading to failure of the nugget. Such cracking near the edges of the nugget tends to occur more easily as the nugget gets smaller, and there is a need for improvement in this area.

In view of the above-described current situation, it would be helpful to provide a galvanized steel sheet with high strength; specifically, with a tensile strength of 1160 MPa or more and excellent resistance spot weldability.

It would also be helpful to provide a method of producing the above-described galvanized steel sheet.

"Excellent resistance spot weldability" means that $D/\sqrt{t}$ (a value obtainable by dividing a smallest nugget diameter, D, (mm) by a square root of a sheet thickness, t, (mm) of the galvanized steel sheet) measured in a resistance spot weldability evaluation described later in the Examples section is 4.0 or less.

Solution to Problem

The present inventors conducted many intensive investigations to address the above-described issues.

First, the present inventors conducted investigations to obtain a high strength with a tensile strength of 1160 MPa or more, and came to believe that it is effective to adjust a chemical composition of the base steel sheet of a galvanized steel sheet appropriately, in particular utilizing C and Mn.

Next, the present inventors examined what factors affect the resistance spot weldability of galvanized steel sheets.

As a result, the amount of diffusible hydrogen in a zinc or zinc alloy coating layer was found to be a factor that affects the resistance spot weldability of galvanized steel sheets (hereinafter referred to as an influential factor in resistance spot weldability).

In other words, the amount of diffusible hydrogen in the zinc or zinc alloy coating layer has conventionally been considered to be a trace amount, and the amount of diffusible hydrogen in the zinc or zinc alloy coating layer has not been considered to be an influential factor in resistance spot weldability.

However, the present inventors conducted investigations and found that:
the zinc or zinc alloy coating layer of a conventionally known galvanized steel sheet contains a certain amount of diffusible hydrogen, and this diffusible hydrogen migrates to the nugget during resistance spot welding, leading to embrittlement of the welded portion; and the amount of diffusible hydrogen in the zinc or zinc alloy coating layer being 0.40 mass ppm or less prevents embrittlement of the welded portion and greatly improves resistance spot weldability, The present disclosure is based on the above-described discoveries and further investigations.

Specifically, the primary features of our sheet and method are as follows.

1. A galvanized steel sheet having a base steel sheet and a zinc or zinc alloy coating layer on a surface of the base steel sheet, the base steel sheet comprising:
   a chemical composition containing (consisting of), in mass %,
   C: 0.08% or more and 0.30% or less
   Si: less than 2.0%,
   Mn: 1.5% or more and 3.5% or less
   P: 0.010% or less,
   S: 0.010% or less,
   Al: 0.10% or less,
   N: 0.006% or less, and
   at least one of Ti, Nb, V and Zr: 0.02% or more and 0.20% or less in total, with the balance being Fe and inevitable impurities,
   wherein an amount of diffusible hydrogen in the zinc or zinc alloy coating layer is 0.40 mass ppm or less, and
   a tensile strength of the galvanized steel sheet is 1160 MPa or more.
2. The galvanized steel sheet according to aspect 1, wherein the chemical composition of the base steel sheet further contains at least one of the following (1) to (3), in mass %,
(1) one or more of Mo, Cr, Cu, and Ni: 0.5% or less in total,
(2) B: 0.0050% or less,
(3) one or both of Sb: 0.10% or less and Sn: 0.10% or less.
3. The galvanized steel sheet according to aspect 1 or 2, wherein an amount of diffusible hydrogen in the galvanized steel sheet is 0.60 mass ppm or less.
4. The galvanized steel sheet according to any of aspects 1 to 3, wherein the zinc or zinc alloy coating layer is a hot-dip galvanized layer or a galvannealed layer with an Fe content of 8 mass % to 15 mass %.
5. The galvanized steel sheet according to any of aspects 1 to 4, wherein a coating weight of the zinc or zinc alloy coating layer is 20 g/m$^2$ to 120 g/m$^2$ per side.
6. A method of producing a galvanized steel sheet, comprising:
preparing a blank sheet having the chemical composition according to aspect 1 or 2;
then annealing the blank sheet at under a set of conditions including an annealing temperature of 750° C. to 870° C. and an atmosphere in a temperature range of 650° C. or more with a hydrogen concentration of 20 volume % or less;
then cooling the blank sheet to a holding temperature range of 450° C. to 550° C. and maintaining at the holding temperature range for 15 seconds or more; and
then subjecting the blank sheet to a hot-dip galvanizing treatment under a set of conditions including a treatment atmosphere with a hydrogen concentration of 15 volume % or less.
7. The method of producing a galvanized steel sheet according to aspect 6, wherein after the hot dip galvanizing treatment, an alloying treatment is performed.

Advantageous Effect

The present disclosure provides a galvanized steel sheet with high strength and excellent resistance spot weldability.

DETAILED DESCRIPTION

The presently disclosed techniques will be described below by way of embodiments.

[1] Galvanized Steel Sheet

First, the chemical composition of the base steel sheet of the galvanized steel sheet according to one embodiment of the present disclosure is described. The % representations below indicating the chemical compositions are in mass % unless stated otherwise.

C: 0.08% or more and 0.30% or less

C is an effective element for increasing the strength of steel, in particular contributing to increasing the strength of steel by forming martensite, one of the hard phases in a steel microstructure. From the viewpoint of obtaining a desired high strength, specifically a tensile strength of 1160 MPa or more, a C content is 0.08% or more. On the other hand, the C content exceeding 0.30% leads to a reduction in resistance spot weldability. Therefore, the C content is 0.08% or more and 0.30% or less. The C content is preferably 0.09% or more, and more preferably 0.10% or more. The C content is preferably 0.28% or less.

Si: Less than 2.0%.

Si is an effective element for increasing the strength of steel. From the viewpoint of obtaining this effect, a Si content is preferably 0.1% or more. On the other hand, if the Si content is 2.0% or more, Si-based oxides more easily form on the surface of the base steel sheet, which may cause non-coating. This may also damage the surface appearance. Therefore, the Si content is less than 2.0%. The Si content is preferably 1.8% or less, and more preferably 1.6% or less.

Mn: 1.5% or more and 3.5% or less

Mn is an element which contributes to increasing the strength of steel through solid solution strengthening and martensite formation. To obtain this effect, a Mn content is 1.5% or more. The Mn content is preferably 1.8% or more, and more preferably 2.0% or more. On the other hand, the Mn content exceeding 3.5% leads to cracking of the welded portion during resistance spot welding. Unevenness in the steel microstructure caused by Mn segregation and other factors leads to a reduction in workability. Mn may form oxides or complex oxides on the surface of the base steel sheet, causing non-coating. Therefore, the Mn content is 3.5% or less. The Mn content is preferably 3.4% or less, and more preferably 3.3% or less.

P: 0.010% or less

P is an element which contributes to increasing the strength of steel through solid solution strengthening. However, a P content exceeding 0.010% reduces resistance spot weldability, as well as workability such as stretch flangeability. Therefore, the P content is 0.010% or less. The P content is preferably 0.008% or less, and more preferably 0.007% or less. The lower limit of the P content is not particularly limited. However, attempting to reduce the P content to less than 0.001% leads to a reduction in production efficiency and cost increases due to dephosphorization in the production process. Therefore, the P content is preferably 0.001% or more.

S: 0.010% or less

S causes a reduction in resistance spot weldability and hot brittleness. S is also a harmful element that exists in steel as sulfide inclusions and reduces the workability of steel sheets. Therefore, reducing the S content as much as possible is preferable, and the S content is 0.010% or less. The lower limit of S content is not particularly limited. However, attempting to reduce the S content to less than 0.0001% leads to a reduction in production efficiency and cost increases due to desulfurization in the production process. Therefore, the S content is preferably 0.0001% or more.

Al: 0.10% or less

Al is added as a deoxidizing material. From the viewpoint of obtaining this effect, an Al content is preferably 0.005% or more and more preferably 0.01% or more. The Al content is more preferably 0.02% or more. On the other hand, the Al content exceeding 0.10% leads to a reduction in resistance spot weldability. It also causes an increase in raw material costs and induces surface defects in steel sheets. Therefore, the Al content is 0.10% or less. The Al content is preferably 0.09% or less, and more preferably 0.08% or less.

N: 0.006% or less

An N content exceeding 0.006% leads to excessive nitrides being formed in the steel and a reduction in ductility and toughness. This may also lead to deterioration of surface characteristics. Therefore, the Ni content is 0.006% or less. The N content is preferably 0.005% or less, and more preferably 0.004% or less. From the viewpoint of improving ductility by cleaning ferrite, the N content is preferably as low as possible. However, attempts to excessively reduce N lead to a reduction of production efficiency and cost increases in the production process. Therefore, the N content is preferably 0.0001% or more. The N content is more preferably 0.0010% or more, and even more preferably 0.0015% or more.

One or more of Ti, Nb, V, and Zr: 0.02% or more and 0.20% or less in total

Ti, Nb, V, and Zr form fine precipitates such as carbides and nitrides (and sometimes carbonitrides) with C and N. These fine precipitates act as hydrogen trapping sites (neutralization). Therefore, these fine precipitates have the effect of making the hydrogen contained in the base steel sheet (hereinafter referred to as hydrogen in the steel) non-diffusible and reducing the amount of diffusible hydrogen in the zinc or zinc alloy coating layer. In other words, these fine precipitates have the effect of reducing the amount of diffusible hydrogen in the zinc or zinc alloy coating layer by inhibiting the direct or indirect transfer of hydrogen in the steel to the zinc or zinc alloy coating layer during the coating treatment and other processes. From the viewpoint of obtaining this effect, one or more of Ti, Nb, V, and Zr is 0.02% or more in total. The total content of these elements is preferably 0.03% or more. However, the total content of these elements exceeding 0.20% leads to deformation resistance increasing during cold rolling and a reduction in productivity. In addition, the ductility of ferrite is reduced due to coarsening of and over-formation of precipitates, which reduces the ductility and workability, such as bendability and stretch flangeability, of the galvanized steel sheet. Therefore, the total content of these elements is 0.20% or less. The total content of these elements is preferably 0.10% or less, and more preferably 0.08% or less.

The above describes the basic components of the base steel sheet for a galvanized steel sheet according to one embodiment of the present disclosure, but the base steel sheet for the galvanized steel sheet according to one of the embodiments of the present disclosure has a chemical composition containing the above basic components, with the balance, other than the above basic components, being Fe (iron) and inevitable impurities. Here, the base steel sheet of the galvanized steel sheet according to one of the embodiments of the present disclosure preferably has a chemical composition containing the above basic components with the balance being Fe and inevitable impurities. In addition to the above basic components, the base steel sheet for a galvanized steel sheet according to one of the embodiments of the present disclosure can further contain at least one of the following (1) to (3) as an optional component.

(1) one or more of Mo, Cr, Cu, and Ni: 0.5% or less in total,
(2) B: 0.0050% or less,
(3) one or both of Sb: 0.10% or less and Sn: 0.10% or less.

The optional components listed below do not have a lower limit, since the prescribed effect is obtainable when the contained amounts are below the upper limit listed below. If any of the following optional components are included in an amount less than suitable lower limits described later, such components are included as inevitable impurities.

One or more of Mo, Cr, Cu and Ni: 0.5% or less in total

Mo, Cr, Cu, and Ni are elements which increase the hardenability of steel and facilitate the formation of martensite, thereby contributing to increasing the strength of steel. From the viewpoint of obtaining this effect, one or more of Mo, Cr, Cu, and Ni is preferably 0.005% or more in total. The total content of these elements is more preferably 0.01% or more, and even more preferably 0.05% or more. However, the total content of these elements exceeding 0.5% leads to saturation of the above-described effects and cost increases. Therefore, the total content of these elements is preferably 0.5% or less.

Cu may cause surface defects by inducing cracking during hot rolling. In this regard, since Ni has an effect of deterring the occurrence of surface defects caused by Cu, when including Cu, Ni is preferably included at the same time. In this case, in particular, a Ni content is preferably ½ or more of the Cu content.

B: 0.0050% or less

B is another element that increases the hardenability of steel and facilitates the formation of martensite, thereby contributing to increasing the strength of steel. From the viewpoint of obtaining this effect, a B content is preferably 0.0003% or more. The B content is more preferably 0.0005% or more, and even more preferably 0.0010% or more. However, the B content exceeding 0.0050% leads to saturation of the above-described effect. This may also lead to the hardenability of the steel excessively increasing and cracking of the welded portion during resistance spot welding. Therefore, the B content is preferably 0.0050% or less.

Sb: 0.10% or less

Sb is an element which inhibits decarburization, denitrification, and deboronization, thereby reducing strength reduction in steel sheets. This also works effectively in suppressing the cracking of welded portions due to resistance spot welding. Therefore, an Sb content is preferably 0.001% or more. The Sb content is more preferably 0.003% or more, and even more preferably 0.005% or more. However, the Sb content exceeding 0.10% reduces the workability, such as stretch flangeability, of the galvanized steel sheet. Therefore, the Sb content is preferably 0.10% or less. The Sb content is more preferably 0.030% or less, and even more preferably 0.010% or less.

Sn: 0.10% or less

Similar to Sb, Sn is an element which inhibits decarburization, denitrification, and deboronization, thereby reducing strength reduction in steel sheets. This also works effectively in suppressing the cracking of welded portions due to resistance spot welding. Therefore, an Sn content is preferably 0.001% or more. The Sn content is more preferably 0.003% or more, and even more preferably 0.005% or more. However, the Sn content exceeding 0.10% reduces the workability, such as stretch flangeability, of the galvanized steel sheet. Therefore, the Sn content is preferably 0.10% or less. The Sn content is more preferably 0.030% or less, and even more preferably 0.010% or less.

The balance, other than the above-described elements, is Fe and inevitable impurities. If any of the above-described optional elements are included in an amount less than the suitable lower limits described earlier, such elements are included as inevitable impurities.

Next is a description of a suitable steel microstructure for the base steel sheet of the galvanized steel sheet according to one of the embodiments of the present disclosure.

From the viewpoint of obtaining a tensile strength of 1160 MPa or more, the area ratio of martensite to the entire microstructure (hereinafter referred to simply as the area ratio) is preferably 40% or more. The martensite area ratio is more preferably 60% or more, and even more preferably 80% or more. The martensite area ratio may be 100%.

The area ratio of residual microstructure other than martensite is preferably 60% or less. The area ratio of the residual microstructure is more preferably 40% or less, and even more preferably 20% or less. The area ratio of the residual microstructure may be 0%.

Examples of the residual microstructure include ferrite, retained austenite, pearlite, and bainite.

The area ratio of martensite is also measured as follows.

In detail, a test piece is taken from a galvanized steel sheet such that an L-cross-section parallel to a rolling direction of the base steel sheet is a test surface. The test surface of the test piece is then mirror polished, and the texture is revealed with a nital solution. The test surface of the test piece with revealed microstructure is observed using a SEM (scanning electron microscope) with a magnification of 1500×, and the area ratio of martensite at ¼ of the sheet thickness of the base steel sheet is measured by point counting. The area ratio of the residual microstructure is calculated by subtracting the area ratio of martensite from 100%. In the SEM image, martensite exhibits a white microstructure.

The zinc or zinc alloy coating layer of the galvanized steel sheet according to one of the embodiments of the present disclosure may be provided on only one surface of the base steel sheet or on both surfaces.

The zinc or zinc alloy coating layer here refers to a coated layer in which Zn is the main component (a Zn content of 80 mass % or more), for example, a hot-dip galvanized layer or a galvannealed layer.

Here, the hot dip galvanized layer is basically composed of Zn, and the balance, other than Zn, is inevitable impurities.

The galvannealed layer is basically composed of Zn and 8 mass % to 15 mass % of Fe, with the components of the balance, other than Zn and Fe, being inevitable impurities.

Also, the amount of diffusible hydrogen being 0.40 mass ppm or less in the zinc or zinc alloy coating layer of the galvanized steel sheet according to one of the embodiments of the present disclosure is extremely important.

The amount of diffusible hydrogen in the zinc or zinc alloy coating layer: 0.40 mass ppm or less Diffusible hydrogen in the zinc or zinc alloy coating layer of the galvanized steel sheet migrates to the nugget during resistance spot welding, leading to embrittlement of the welded portion. Therefore, the amount of diffusible hydrogen in the zinc or zinc alloy coating layer is 0.40 mass ppm or less. The amount of diffusible hydrogen in the zinc or zinc alloy coating layer is preferably 0.30 mass ppm or less, more preferably 0.20 mass ppm or less. The lower limit of the amount of diffusible hydrogen in the zinc or zinc alloy coating layer is not particularly limited and may be 0 mass ppm. However, attempting to reduce the amount of diffusible hydrogen in the zinc or zinc alloy coating layer to less than 0.01 mass ppm may lead to a reduction in production efficiency in the production process. Therefore, the amount of diffusible hydrogen in the zinc or zinc alloy coating layer is 0.01 mass ppm or more.

The amount of diffusible hydrogen in the zinc or zinc alloy coating layer is calculated by the following equation.

[Amount of diffusible hydrogen in zinc or zinc alloy coating layer (mass ppm)]=[amount of diffusible hydrogen in galvanized steel sheet (mass ppm)]−[amount of diffusible hydrogen in base steel sheet (mass ppm)].

The amounts of diffusible hydrogen in the galvanized steel sheet and the base steel sheet are values obtained from specimens of the galvanized steel sheet and the base steel sheet, respectively, by dividing the amount of released hydrogen released by the mass of a specimen, which is measured under a set of conditions including a heating end-point temperature of 300° C. and a heating rate of 200° C./hr, by thermal desorption analysis using gas chromatography.

The amount of diffusible hydrogen in the galvanized steel sheet (as a whole) is more specifically measured as follows.

In detail, using a galvanized steel sheet as a specimen, measure the hydrogen release rate (the amount of hydrogen per minute released from the specimen) by thermal desorption analysis using gas chromatography under under a set of conditions including a heating end-point temperature of 300° C., a heating rate of 200° C./hr, and a measurement cycle of 5 min. The total amount of hydrogen released from the specimen is then calculated by integrating the hydrogen release rate measured at each measurement cycle over the measurement time (the time from the start of the temperature rise to 300° C.). The total amount of hydrogen released from the specimen is then divided by the mass of a sample (before analysis) and converted to mass ppm units, which is the amount of diffusible hydrogen of the galvanized steel sheet.

Specifically, the above-described integration is performed with the following equation.

[Total amount of hydrogen released from the specimen]=$(A_1+A_2+\ldots+A_{N-1})\times 5$ min+$A_N\times$(Time from the Nth measurement to reach 300° C. (min))

where N is the number of measurements from the start of the heating until the temperature reaches 300° C., and $A_N$ is the hydrogen release rate (the amount of hydrogen per min released from the specimen) at the Nth measurement.

The amount of diffusible hydrogen in the base steel sheet is more specifically measured as follows.

In other words, the zinc or zinc alloy coating layer on the surface of the galvanized steel sheet is removed by physically grinding it with a die grinder or similar tool. The amount of grinding of a base steel sheet portion is within 5% of the sheet thickness of the base steel sheet. Then, using a steel sheet formed from only the base steel sheet portion, from which the zinc or zinc alloy coating layer has been removed, as a specimen, performing thermal desorption analysis using gas chromatography with the above-described instructions (the same instructions as the method for measuring the amount of diffusible hydrogen in the galvanized steel sheet) to measure the amount of diffusible hydrogen in the base steel sheet.

Amount of diffusible hydrogen in galvanized steel sheet (as a whole): 0.60 mass ppm or less In addition to the diffusible hydrogen in the zinc or zinc alloy coating layer of the galvanized steel sheet, the diffusible hydrogen in the base steel sheet also migrates to the nugget during resistance spot welding, leading to embrittlement of the welded portion. Therefore, the amount of diffusible hydrogen in the galvanized steel sheet (as a whole) is 0.60 mass ppm or less. The amount of diffusible hydrogen in the galvanized steel sheet (as a whole) is more preferably 0.45 mass ppm or less, and even more preferably 0.30 mass ppm or less. The lower limit of the amount of diffusible hydrogen in the galvanized steel sheet (as a whole) is not particularly limited and may be 0 mass ppm. However, attempting to reduce the amount of diffusible hydrogen in the galvanized steel sheet (as a whole) to less than 0.01 mass ppm, may lead to a reduction in production efficiency in the production process. Therefore, the amount of diffusible hydrogen in the zinc or zinc alloy coating layer is 0.01 mass ppm or more.

In addition, the coating weight of the zinc or zinc alloy coating layer is preferably 20 g/m$^2$ to 120 g/m$^2$ per side. This is because when the coating weight of the zinc or zinc alloy coating layer is less than 20 g/m$^2$ per side, the anti-corrosion properties of the galvanization may be insufficient. Also, the coating weight of the zinc or zinc alloy coating layer exceeding 120 g/m$^2$ per side will result in high costs.

The coating weight of the zinc or zinc alloy coating layer and an Fe content in the zinc or zinc alloy coating layer (galvannealed layer) are measured as follows.

In other words, adjusting a coating solution to which 0.6 g of a corrosion inhibitor for Fe ("Ivit 700BK®" manufactured by Asahi Chemical Industry Co.; Ivit 700BK is a registered trademark in Japan, other countries, or both) is added, for 1 L of 10 mass % hydrochloric acid solution. the galvanized steel sheet, which is the specimen, is then immersed in the coating solution to dissolve the zinc or zinc alloy coating layer. The mass loss of the specimen before and after melting is measured, and the value is divided by the surface area of the base steel sheet to calculate the coating weight (g/m$^2$).

The amounts of Zn and Fe dissolved in the above-described coating solution (hereinafter referred to as Zn dissolved amount and Fe dissolved amount) are measured by ICP (inductively coupled plasma) optical emission spectrometry to determine the Fe content in the zinc or zinc alloy coating layer using the following formula.

[Fe content in the zinc or zinc alloy coating layer (mass %)]=[Fe dissolved amount]/([Fe dissolved amount]+[Zn dissolved amount])×100

Tensile Strength (TS): 1160 MPa or More

The tensile strength of the galvanized steel sheet according to one of the embodiments of the present disclosure is 1160 MPa or more. The tensile strength of the galvanized steel sheet according to one of the embodiments of the present disclosure is preferably 1180 MPa or more.

Here, tensile strength (TS) is measured as follows.

A JIS (Japanese industrial standard) No. 5 test piece is taken from a galvanized steel sheet with the longitudinal direction perpendicular to the rolling direction of the base steel sheet, with a gauge length of 50 mm. The collected JIS No. 5 test piece is then used to conduct a tensile test in accordance with the provisions of JIS Z 2241 (2011) to measure the tensile strength (TS). The tensile speed is 10 mm/min.

The sheet thickness of the galvanized steel sheet according to one of the embodiments of the present disclosure is preferably 0.8 mm or more. The sheet thickness of the galvanized steel sheet is preferably 2.0 mm or less.

[2] Method of Producing a Galvanized Steel Sheet

Next is a description of a method of producing a galvanized steel sheet according to one of the embodiments of the present disclosure. Each of the following temperatures refers to the surface temperatures of the slab and steel sheet, unless described otherwise.

First, a blank sheet having the above-described chemical composition is prepared.

Such blank sheets may be prepared by, for example,
a slab heating process, in which a slab having the above-described chemical composition is heated and maintained at a holding temperature range,
a hot rolling process, in which the slab is subjected to hot rolling to make a hot-rolled steel sheet, and
a cold rolling process, in which the hot-rolled steel sheet is subjected to cold-rolling to make a cold-rolled steel sheet.

For the conditions in each of the processes, conventional methods may be followed. The hot-rolled steel sheets obtained in the hot rolling process may also be pickled. Pickling conditions are also not particularly limited, and conventional methods may be followed.

The resulting blank sheet is then subject to annealing. In this process, appropriately controlling the annealing temperature and the atmosphere in a temperature range of 650° C. or more is important.

Annealing temperature: 750° C. to 870° C.

If the annealing temperature is less than 750° C., the volume fraction of martensite of the steel sheet microstructure decreases and the desired TS cannot be obtained. If the annealing temperature exceeds 870° C., the amount of hydrogen contained in the steel sheet during annealing increases, which ultimately increases the amount of hydrogen contained in the coating. For the above reasons, the annealing temperature is 750° C. to 870° C. The annealing temperature is the maximum arrival temperature during the annealing.

Hydrogen concentration of the atmosphere in a temperature range of 650° C. or more: 20 volume % or less Hydrogen being absorbed into the blank sheet leads to an increase in the amount of hydrogen in the steel and, consequently, the amount of diffusible hydrogen in the zinc or zinc alloy coating layer. In particular, the amount of hydrogen absorbed by the blank sheet increases in the temperature range of 650° C. or more. Therefore, the hydrogen concentration in the atmosphere in the temperature range of 650° C. or more (hereinafter referred to as the annealing atmosphere) is 20 volume % or less. The hydrogen concentration in the annealing atmosphere is preferably 10 volume % or less, more preferably 6 volume % or less. However, excessively reducing the hydrogen in the annealing atmosphere may cause surface defects such as non-coating of the zinc or zinc alloy coating layer of the galvanized steel sheet which is the final product. Therefore, the hydrogen concentration in the annealing atmosphere is preferably 1 volume % or more. The balance of the annealing atmosphere, other than hydrogen, includes, for example, nitrogen and water vapor. In the balance of the annealing atmosphere, other than hydrogen, unavoidable gases such as oxygen may be present in trace amounts (100 volume ppm or less, for example, tens of volume ppm).

For any other annealing conditions, conventional methods may be followed. For example, an annealing time of 30 seconds to 600 seconds is suitable.

The above-described blank sheet is then cooled to a holding temperature range of 450° C. to 550° C. and maintained at the holding temperature range for 15 seconds or more.

Holding time in holding temperature range: 15 seconds or more

Even if the hydrogen concentration in the annealing atmosphere is reduced, a certain amount of hydrogen is absorbed by the blank sheet during holding near the annealing temperature. In this regard, dehydrogenation of the blank sheet can be performed by cooling the blank sheet to a holding temperature range of 450° C. to 550° C. and maintaining that holding temperature range for a certain time. However, the holding time in the holding temperature range being less than 15 seconds insufficiently dehydrogenates the blank sheet, leading to an increase in the amount of hydrogen in the steel and, consequently, the amount of diffusible hydrogen in the zinc or zinc alloy coating layer. Therefore, the holding time in the holding temperature range is 15 seconds or more. The holding time in the holding temperature range is preferably 30 seconds or longer. The upper limit of the holding time in the holding temperature range is not particularly limited, but the holding time in the holding temperature range is preferably 600 seconds or less. The holding time in the holding temperature range is a resident time in that holding temperature range from the annealing to the hot dip galvanizing treatment, and the temperature during holding may not always be constant.

The hydrogen concentration of the atmosphere in the holding temperature range is preferably 15 volume % or less. The lower limit of hydrogen concentration in the atmosphere in the holding temperature range is not particularly limited and may be 0 volume %. The balance of the atmosphere in the holding temperature range, other than hydrogen, includes, for example, nitrogen and water vapor. In the balance of the atmosphere in the holding temperature range other than hydrogen, unavoidable gases such as oxygen may be present in trace amounts (100 volume ppm or less, for example, tens of volume ppm).

The above-described blank sheet is then subjected to hot dip galvanizing treatment to produce a galvanized steel sheet (hot dip galvanized steel sheet) having a hot dip galvanized layer. Alternatively, the above-described cold-rolled steel sheet is subjected to hot-dip galvanizing treatment and alloying treatment to produce a galvanized steel sheet (galvannealed steel sheet) having a galvannealed layer. During the hot dip galvanizing treatment, appropriately controlling the hydrogen concentration in the coating treatment atmosphere is important.

Hydrogen concentration in the coating treatment atmosphere: 15 volume % or less

Diffusible hydrogen in the zinc or zinc alloy coating layer of the galvanized steel sheet, which is the final product, is mainly introduced through the hot dip galvanizing bath (although some is introduced directly or indirectly from the base steel sheet). To reduce the hydrogen contained in the hot dip galvanizing bath, it is effective to reduce the hydrogen concentration in the coating treatment atmosphere in contact with the hot dip galvanizing bath surface. Therefore, the hydrogen concentration in the coating treatment atmosphere is 15 volume % or less. The hydrogen concentration in the coating treatment atmosphere is preferably 10 volume % or less, more preferably 5 volume % or less. However, excessive reduction of hydrogen in the coating treatment atmosphere may cause surface defects such as non-coating in the zinc or zinc alloy coating layer of the galvanized steel sheet which is the final product. Therefore, the hydrogen concentration in the coating treatment atmosphere is 1 volume % or more. The balance in the coating treatment atmosphere, other than hydrogen, includes, for example, nitrogen and water vapor. In the balance of the coating treatment atmosphere other than hydrogen, unavoidable gases such as oxygen may be present in trace amounts (100 volume ppm or less, for example, tens of volume ppm).

The hydrogen concentration in the coating treatment atmosphere can be measured, for example, at a snout (a sheet passage which connects an annealing furnace outlet and a hot dip galvanizing bath tank and which is isolated from the air environment).

Any other hot dip galvanizing treatment conditions and alloying treatment conditions are not particularly limited, and conventional methods may be followed. For example, the alloying temperature in the alloying treatment may be 470° C. to 600° C. The above-described annealing and hot dip galvanizing treatment may be performed in a CAL (continuous annealing line) or in a CGL (continuous annealing hot dip galvanizing line). The annealing and hot dip galvanizing treatment may also be performed in batches.

After the coating treatment, a further post heat treatment may be suitably performed on the above-described galvanized steel sheet under a set of conditions including treatment temperature of 30° C. to 200° C. and a treatment time of 1 hour or more and 2160 hours or less. This post heat treatment can further reduce the amount of diffusible hydrogen in the zinc or zinc alloy coating layer of galvanized steel sheet, and even in the entire galvanized steel sheet, without degrading material properties.

Examples

Slabs having the chemical compositions listed in Table 1 (the balance being Fe and inevitable impurities) were subjected to hot-rolling under a set of conditions including the conditions listed in Table 2 to make hot-rolled steel sheets, the hot-rolled steel sheets were subjected to pickling, and then cold-rolling under a set of conditions including the conditions listed in Table 2 to prepare blank sheets.

The prepared blank sheets were then annealed under a set of conditions including the conditions listed in Table 2. The blank sheets were then cooled to a holding temperature range of 450° C. to 550° C. and maintained at that holding temperature range for the holding times listed in Table 2. The blank sheets were then subjected to hot dip galvanizing treatment under a set of conditions including the conditions listed in Table 2, and further, the steel sheets other than No. 14 were subjected to alloying treatment under a set of conditions including the conditions listed in Table 2 to obtain galvanized steel sheets having zinc or zinc alloy coating layers (a hot dip zinc or zinc alloy coating layer or a galvannealed layer) on both surfaces. No. 15 was further subjected to post heat treatment under a set of conditions including the conditions listed in Table 2. The balances in the annealing atmosphere and coating treatment atmosphere, other than hydrogen, were all nitrogen, water vapor, and unavoidable gases. The annealing, hot dip galvanizing treatment, and alloying treatment were performed using a continuous hot-dip galvanizing line.

The resulting galvanized steel sheets were used to measure (1) the coating weight, (2) the Fe content in the zinc or zinc alloy coating layer, (3) the amount of diffusible hydrogen in the galvanized steel sheet, base steel sheet, and zinc or zinc alloy coating layer, and (4) tensile strength as described above. The measurement results are listed in Table 3. Measurements of coating weight and the Fe content in the zinc or zinc alloy coating layer were performed on both the front and back surfaces, and for convenience, the results are listed with one surface as a first surface and the other surface as a second surface.

The area ratios of martensite in the steel microstructures of the base steel sheets were measured as described above, and the area ratio of martensite was 40% or more for each of the steel sheets.

Resistance spot weldability was then evaluated using the resulting galvanized steel sheets as follows.

Evaluation of Resistance Spot Weldability

From the resulting galvanized steel sheets, 30 mm×100 mm of sheet material was taken. Then, two sheets of sheet material taken from the galvanized steel sheet were superimposed on each other with 2 mm thick sheets (30 mm×30 mm) as spacers sandwiched therebetween at both ends of the two sheets of sheet material in the longitudinal direction. The spacer interval was 40 mm, and the two sheets of sheet material and spacers were fixed by welding beforehand. The overlapping two sheets of sheet material were then joined at a center portion between the spacers at both ends by resistance spot welding to produce a test piece. In this resistance spot welding, an inverter DC resistance spot welder was used, and the electrode was a dome type with a tip diameter of 6 mm made of chrome copper. The applied pressure was 380 kgf, the welding time was 16 cycles/50 Hz, and the holding time was 5 cycles/50 Hz. The welding current was varied from 4.0 kA to 6.0 kA in 0.1 kA increments using multiple test pieces made from the same galvanized steel sheet to produce weldments with various nugget diameters.

After storing the produced weldments for 24 hours after welding, the spacer portions were cut off and the weld nuggets were observed in cross-section to visually check for cracking (cracks) due to embrittlement. The smallest nugget diameter D (mm) with no cracks observed was then determined, and this smallest nugget diameter D (mm) was divided by the square root of the sheet thickness t (mm) of the galvanized steel sheet to obtain $D/\sqrt{t}$. Resistance spot weldability was then evaluated according to the following criteria. The evaluation results are listed in Table 3.

⊚ (Pass, particularly excellent): $D/\sqrt{t}$ is 3.0 or less
◯ (Pass, Excellent): $D/\sqrt{t}$ is more than 3.0 and is 4.0 or less
× (Fail): $D/\sqrt{t}$ is more than 4.0

TABLE 1

| Steel sample ID | Chemical composition (mass %) | | | | | | | | | | | | | | | | | Remarks |
|---|---|---|---|---|---|---|---|---|---|---|---|---|---|---|---|---|---|---|
| | C | Si | Mn | P | S | Al | N | Ti | Nb | V | Zr | Mo | Cr | Cu | Ni | B | Sb | Sn | |
| A | 0.11 | 0.2 | 2.6 | 0.006 | 0.002 | 0.04 | 0.002 | 0.02 | 0.02 | — | — | — | — | — | — | — | — | — | Conforming steel |
| B | 0.10 | 0.2 | 2.7 | 0.005 | 0.002 | 0.03 | 0.003 | 0.03 | — | — | — | — | — | — | — | — | — | — | Conforming steel |
| C | 0.11 | 0.2 | 2.6 | 0.007 | 0.003 | 0.03 | 0.002 | — | 0.03 | — | — | — | — | — | — | — | — | — | Conforming steel |
| D | 0.11 | 0.2 | 2.6 | 0.006 | 0.002 | 0.03 | 0.003 | — | — | 0.03 | — | — | — | — | — | — | — | — | Conforming steel |
| E | 0.11 | 0.2 | 2.5 | 0.006 | 0.003 | 0.04 | 0.003 | — | — | — | 0.03 | — | — | — | — | — | — | — | Conforming steel |
| F | 0.11 | — | 2.4 | 0.007 | 0.004 | 0.04 | 0.003 | 0.05 | — | — | — | — | — | — | — | — | — | — | Conforming steel |
| G | 0.11 | — | 2.6 | 0.007 | 0.002 | 0.03 | 0.002 | — | 0.05 | — | — | — | — | — | — | — | — | — | Conforming steel |
| H | 0.11 | 0.2 | 2.4 | 0.006 | 0.004 | 0.04 | 0.004 | 0.01 | 0.01 | — | — | — | — | — | — | — | — | — | Conforming steel |
| I | 0.12 | 0.2 | 2.5 | 0.007 | 0.002 | 0.03 | 0.004 | 0.02 | 0.02 | 0.02 | — | — | — | — | — | — | — | — | Conforming steel |
| J | 0.11 | 0.2 | 2.4 | 0.006 | 0.004 | 0.04 | 0.002 | 0.02 | — | — | 0.04 | — | — | — | — | — | — | — | Conforming steel |
| K | 0.10 | 0.2 | 2.6 | 0.007 | 0.003 | 0.04 | 0.003 | 0.06 | — | 0.06 | — | — | — | — | — | — | — | — | Conforming steel |
| L | 0.11 | 0.2 | 2.5 | 0.006 | 0.003 | 0.03 | 0.003 | 0.02 | 0.02 | — | — | 0.20 | — | — | — | — | — | — | Conforming steel |
| M | 0.11 | 0.2 | 2.5 | 0.006 | 0.004 | 0.03 | 0.004 | 0.02 | 0.02 | — | — | — | 0.20 | — | — | — | — | — | Conforming steel |
| N | 0.11 | 0.2 | 2.5 | 0.007 | 0.002 | 0.02 | 0.003 | 0.02 | 0.02 | — | — | — | — | 0.20 | — | — | — | — | Conforming steel |
| O | 0.11 | 0.2 | 2.5 | 0.006 | 0.003 | 0.03 | 0.003 | 0.02 | 0.02 | — | — | — | — | — | 0.20 | — | — | — | Conforming steel |
| P | 0.10 | 0.2 | 2.6 | 0.006 | 0.004 | 0.04 | 0.003 | 0.02 | 0.02 | — | — | — | — | — | — | 0.0020 | — | — | Conforming steel |
| Q | 0.10 | 0.2 | 2.7 | 0.005 | 0.003 | 0.02 | 0.003 | 0.02 | 0.02 | — | — | — | — | — | — | — | 0.02 | — | Conforming steel |
| R | 0.11 | 0.2 | 2.7 | 0.005 | 0.002 | 0.02 | 0.003 | 0.02 | 0.02 | — | — | — | — | — | — | — | — | 0.02 | Conforming steel |
| S | 0.19 | 0.2 | 2.6 | 0.005 | 0.002 | 0.03 | 0.003 | 0.02 | 0.02 | — | — | — | — | — | — | — | — | — | Conforming steel |
| T | 0.28 | 0.2 | 2.6 | 0.007 | 0.003 | 0.03 | 0.003 | 0.02 | 0.02 | — | — | — | — | — | — | — | — | — | Conforming steel |
| U | 0.12 | 1.4 | 2.5 | 0.005 | 0.003 | 0.04 | 0.002 | 0.02 | 0.02 | — | — | — | — | — | — | — | — | — | Conforming steel |
| V | 0.10 | 0.2 | 1.7 | 0.007 | 0.002 | 0.02 | 0.003 | 0.02 | 0.02 | — | — | — | — | — | — | — | — | — | Conforming steel |

TABLE 1-continued

| Steel sample ID | Chemical composition (mass %) | | | | | | | | | | | | | | | | | Remarks |
|---|---|---|---|---|---|---|---|---|---|---|---|---|---|---|---|---|---|---|
| | C | Si | Mn | P | S | Al | N | Ti | Nb | V | Zr | Mo | Cr | Cu | Ni | B | Sb | Sn | |
| W | 0.11 | 0.2 | 3.2 | 0.006 | 0.004 | 0.02 | 0.002 | 0.02 | 0.02 | — | — | — | — | — | — | — | — | — | Conforming steel |
| AA | 0.11 | 0.2 | 2.6 | 0.007 | 0.004 | 0.03 | 0.003 | — | — | — | — | — | — | — | — | — | — | — | Comparative steel |
| AB | 0.11 | 0.2 | 2.5 | 0.006 | 0.002 | 0.03 | 0.002 | 0.01 | — | — | — | — | — | — | — | — | — | — | Comparative steel |
| AC | 0.11 | 0.2 | 2.4 | 0.006 | 0.004 | 0.03 | 0.002 | — | 0.01 | — | — | — | — | — | — | — | — | — | Comparative steel |
| AD | 0.11 | 0.2 | 2.5 | 0.006 | 0.002 | 0.03 | 0.002 | — | — | 0.01 | — | — | — | — | — | — | — | — | Comparative steel |
| AE | 0.11 | 0.2 | 2.4 | 0.006 | 0.004 | 0.03 | 0.002 | — | — | — | 0.01 | — | — | — | — | — | — | — | Comparative steel |
| AF | 0.07 | 0.2 | 2.6 | 0.006 | 0.002 | 0.04 | 0.002 | 0.02 | 0.02 | — | — | — | — | — | — | — | — | — | Comparative steel |

TABLE 2

| | | Production conditions | | | | | | | | | |
|---|---|---|---|---|---|---|---|---|---|---|---|
| | | Hot rolling | | Cold rolling | Annealing | | Maintenance | Coating treatment | | Post heating | | |
| | | Finishing rolling | Winding | | | | | | | | | |
| No. | Steel sample ID | Heating temp. (° C.) | end temp. (° C.) | temp. (° C.) | Rolling ratio (%) | Annealing temp. (° C.) | Hydrogen concentration (Volume %) | Holding time (s) | Hydrogen concentration (Volume %) | Alloying temp. (° C.) | Treatment temp. (° C.) | Treatment time (hr) | Remarks |
| 1 | A | 1200 | 900 | 550 | 40 | 830 | 10 | 25 | 10 | 530 | — | — | Example |
| 2 | A | 1200 | 900 | 550 | 40 | 830 | 5 | 25 | 5 | 530 | — | — | Example |
| 3 | A | 1200 | 900 | 550 | 40 | 830 | 6 | 25 | 10 | 530 | — | — | Example |
| 4 | A | 1200 | 900 | 550 | 40 | 830 | 4 | 25 | 10 | 530 | — | — | Example |
| 5 | A | 1200 | 900 | 550 | 40 | 830 | 3 | 25 | 10 | 530 | — | — | Example |
| 6 | A | 1200 | 900 | 550 | 40 | 830 | 14 | 25 | 10 | 530 | — | — | Example |
| 7 | A | 1200 | 900 | 550 | 40 | 830 | 18 | 25 | 10 | 530 | — | — | Example |
| 8 | A | 1200 | 900 | 550 | 40 | 830 | 22 | 25 | 10 | 530 | — | — | Comparative example |
| 9 | A | 1200 | 900 | 550 | 40 | 830 | 10 | 25 | 8 | 530 | — | — | Example |
| 10 | A | 1200 | 900 | 550 | 40 | 830 | 10 | 25 | 5 | 530 | — | — | Example |
| 11 | A | 1200 | 900 | 550 | 40 | 830 | 10 | 25 | 3 | 530 | — | — | Example |
| 12 | A | 1200 | 900 | 550 | 40 | 830 | 10 | 25 | 14 | 530 | — | — | Example |
| 13 | A | 1200 | 900 | 550 | 40 | 830 | 10 | 25 | 17 | 530 | — | — | Comparative example |
| 14 | A | 1200 | 900 | 550 | 40 | 830 | 10 | 25 | 10 | — | — | — | Example |
| 15 | A | 1200 | 900 | 550 | 40 | 830 | 10 | 25 | 10 | 530 | 100 | 24 | Example |
| 16 | A | 1200 | 900 | 550 | 40 | 830 | 10 | 15 | 10 | 530 | — | — | Example |
| 17 | A | 1200 | 900 | 550 | 40 | 830 | 10 | 10 | 10 | 530 | — | — | Comparative example |
| 18 | A | 1200 | 900 | 550 | 36 | 830 | 10 | 25 | 10 | 530 | — | — | Example |
| 19 | A | 1200 | 900 | 550 | 44 | 830 | 10 | 25 | 10 | 530 | — | — | Example |
| 20 | B | 1200 | 900 | 550 | 40 | 830 | 10 | 25 | 10 | 530 | — | — | Example |
| 21 | C | 1200 | 900 | 550 | 40 | 830 | 10 | 25 | 10 | 530 | — | — | Example |
| 22 | D | 1200 | 900 | 550 | 40 | 830 | 10 | 25 | 10 | 530 | — | — | Example |
| 23 | E | 1200 | 900 | 550 | 40 | 830 | 10 | 25 | 10 | 530 | — | — | Example |
| 24 | F | 1200 | 900 | 550 | 40 | 830 | 10 | 25 | 10 | 530 | — | — | Example |
| 25 | G | 1200 | 900 | 550 | 40 | 830 | 10 | 25 | 10 | 530 | — | — | Example |
| 26 | H | 1200 | 900 | 550 | 40 | 830 | 10 | 25 | 10 | 530 | — | — | Example |
| 27 | I | 1200 | 900 | 550 | 40 | 830 | 10 | 25 | 10 | 530 | — | — | Example |
| 28 | J | 1200 | 900 | 550 | 40 | 830 | 10 | 25 | 10 | 530 | — | — | Example |
| 29 | K | 1200 | 900 | 550 | 40 | 830 | 10 | 25 | 10 | 530 | — | — | Example |
| 30 | L | 1200 | 900 | 550 | 40 | 830 | 10 | 25 | 10 | 530 | — | — | Example |
| 31 | M | 1200 | 900 | 550 | 40 | 830 | 10 | 25 | 10 | 530 | — | — | Example |
| 32 | N | 1200 | 900 | 550 | 40 | 830 | 10 | 25 | 10 | 530 | — | — | Example |
| 33 | O | 1200 | 900 | 550 | 40 | 830 | 10 | 25 | 10 | 530 | — | — | Example |
| 34 | P | 1200 | 900 | 550 | 40 | 830 | 10 | 25 | 10 | 530 | — | — | Example |
| 35 | Q | 1200 | 900 | 550 | 40 | 830 | 10 | 25 | 10 | 530 | — | — | Example |
| 36 | R | 1200 | 900 | 550 | 40 | 830 | 10 | 25 | 10 | 530 | — | — | Example |
| 37 | S | 1200 | 900 | 550 | 40 | 830 | 10 | 25 | 10 | 530 | — | — | Example |
| 38 | T | 1200 | 900 | 550 | 40 | 830 | 10 | 25 | 10 | 530 | — | — | Example |
| 39 | U | 1200 | 900 | 550 | 40 | 830 | 10 | 25 | 10 | 530 | — | — | Example |
| 40 | V | 1200 | 900 | 550 | 40 | 830 | 10 | 25 | 10 | 530 | — | — | Example |
| 41 | W | 1200 | 900 | 550 | 40 | 830 | 10 | 25 | 10 | 530 | — | — | Example |

TABLE 2-continued

| | | Production conditions | | | | | | | | | |
|---|---|---|---|---|---|---|---|---|---|---|---|
| | | Hot rolling | | | | | Maint-enance | Coating treatment | | Post heating | |
| | | Finishing rolling | Wind- | Cold rolling | Annealing | | | | | | |
| No. | Steel sample ID | Heating temp. (° C.) | end temp. (° C.) | ing temp. (° C.) | Rolling ratio (%) | Annealing temp. (° C.) | Hydrogen concentration (Volume %) | Holding time (s) | Hydrogen concentration (Volume %) | Alloying temp. (° C.) | Treatment temp. (° C.) | Treatment time (hr) | Remarks |
|---|---|---|---|---|---|---|---|---|---|---|---|---|---|
| 42 | AA | 1200 | 900 | 550 | 40 | 830 | 10 | 25 | 10 | 530 | — | — | Comparative example |
| 43 | AB | 1200 | 900 | 550 | 40 | 830 | 10 | 25 | 10 | 530 | — | — | Comparative example |
| 44 | AC | 1200 | 900 | 550 | 40 | 830 | 10 | 25 | 10 | 530 | — | — | Comparative example |
| 45 | AD | 1200 | 900 | 550 | 40 | 830 | 10 | 25 | 10 | 530 | — | — | Comparative example |
| 46 | AE | 1200 | 900 | 550 | 40 | 830 | 10 | 25 | 10 | 530 | — | — | Comparative example |
| 47 | AF | 1200 | 900 | 550 | 40 | 830 | 10 | 25 | 10 | 530 | — | — | Comparative example |
| 48 | A | 1200 | 900 | 550 | 40 | 830 | 5 | 25 | 5 | 530 | — | — | Example |
| 49 | A | 1200 | 900 | 550 | 40 | 830 | 5 | 25 | 5 | 530 | — | — | Example |

TABLE 3

| | Galvanized steel sheet | | | | | | | | | | | |
|---|---|---|---|---|---|---|---|---|---|---|---|---|
| | | (1) Coating weight | | (2) Zinc or zinc alloy-coated layer Fe content | | (3) Amount of Diffusive hydrogen (mass ppm) | | | | Resistance spot weldability | | |
| No. | Sheet thickness t (mm) | First surface (g/m²) | Second surface (g/m²) | First surface (mass %) | Second surface (mass %) | Galvanized steel sheet (as a whole) | Base Steel sheet | Zinc or zinc alloy coating layer | (4) TS (MPa) | Min. nugget diameter D (mm) | D/√t | Evaluation | Remarks |
|---|---|---|---|---|---|---|---|---|---|---|---|---|---|
| 1 | 1.4 | 48 | 49 | 10 | 10 | 0.47 | 0.18 | 0.29 | 1210 | 4.3 | 3.6 | ○ | Example |
| 2 | 1.4 | 50 | 56 | 10 | 11 | 0.27 | 0.13 | 0.14 | 1206 | 3.3 | 2.8 | ◎ | Example |
| 3 | 1.4 | 58 | 56 | 10 | 10 | 0.44 | 0.14 | 0.30 | 1224 | 4.1 | 3.5 | ○ | Example |
| 4 | 1.4 | 51 | 53 | 11 | 10 | 0.40 | 0.12 | 0.28 | 1215 | 3.8 | 3.2 | ○ | Example |
| 5 | 1.4 | 55 | 50 | 10 | 10 | 0.35 | 0.08 | 0.27 | 1209 | 3.7 | 3.1 | ○ | Example |
| 6 | 1.4 | 56 | 51 | 10 | 11 | 0.54 | 0.24 | 0.30 | 1216 | 4.7 | 4.0 | ○ | Example |
| 7 | 1.4 | 54 | 53 | 10 | 11 | 0.57 | 0.32 | 0.25 | 1220 | 4.6 | 3.9 | ○ | Example |
| 8 | 1.4 | 56 | 54 | 11 | 11 | 0.76 | 0.31 | 0.45 | 1219 | 5.5 | 4.6 | X | Comparative example |
| 9 | 1.4 | 54 | 50 | 11 | 10 | 0.38 | 0.18 | 0.20 | 1225 | 4.0 | 3.4 | ○ | Example |
| 10 | 1.4 | 52 | 57 | 11 | 10 | 0.37 | 0.20 | 0.17 | 1214 | 4.1 | 3.5 | ○ | Example |
| 11 | 1.4 | 53 | 56 | 11 | 10 | 0.29 | 0.19 | 0.10 | 1230 | 3.1 | 2.6 | ◎ | Example |
| 12 | 1.4 | 53 | 52 | 11 | 10 | 0.58 | 0.18 | 0.40 | 1208 | 4.7 | 4.0 | ○ | Example |
| 13 | 1.4 | 50 | 50 | 10 | 11 | 0.68 | 0.17 | 0.51 | 1211 | 5.3 | 4.5 | X | Comparative example |
| 14 | 1.4 | 53 | 52 | 0 | 0 | 0.46 | 0.16 | 0.30 | 1231 | 3.8 | 3.2 | ○ | Example |
| 15 | 1.4 | 54 | 53 | 10 | 10 | 0.30 | 0.01 | 0.29 | 1204 | 3.4 | 2.9 | ◎ | Example |
| 16 | 1.4 | 55 | 56 | 10 | 10 | 0.54 | 0.28 | 0.26 | 1210 | 4.3 | 3.6 | ○ | Example |
| 17 | 1.4 | 55 | 56 | 10 | 10 | 0.78 | 0.35 | 0.43 | 1210 | 5.2 | 4.4 | X | Comparative example |
| 18 | 1.2 | 55 | 56 | 11 | 10 | 0.48 | 0.18 | 0.30 | 1211 | 3.8 | 3.5 | ○ | Example |
| 19 | 1.6 | 53 | 55 | 10 | 11 | 0.50 | 0.21 | 0.29 | 1214 | 4.6 | 3.6 | ○ | Example |
| 20 | 1.4 | 58 | 57 | 11 | 10 | 0.50 | 0.21 | 0.29 | 1212 | 4.5 | 3.8 | ○ | Example |
| 21 | 1.4 | 55 | 58 | 10 | 10 | 0.51 | 0.22 | 0.29 | 1231 | 4.6 | 3.9 | ○ | Example |
| 22 | 1.4 | 58 | 57 | 11 | 11 | 0.52 | 0.21 | 0.31 | 1224 | 4.4 | 3.7 | ○ | Example |
| 23 | 1.4 | 57 | 48 | 10 | 10 | 0.52 | 0.22 | 0.30 | 1215 | 4.5 | 3.8 | ○ | Example |
| 24 | 1.4 | 57 | 55 | 10 | 10 | 0.47 | 0.20 | 0.27 | 1234 | 4.3 | 3.6 | ○ | Example |
| 25 | 1.4 | 57 | 56 | 10 | 10 | 0.45 | 0.18 | 0.27 | 1238 | 4.4 | 3.7 | ○ | Example |
| 26 | 1.4 | 54 | 54 | 10 | 10 | 0.52 | 0.22 | 0.30 | 1211 | 4.5 | 3.8 | ○ | Example |
| 27 | 1.4 | 54 | 57 | 10 | 11 | 0.37 | 0.17 | 0.20 | 1241 | 3.8 | 3.2 | ○ | Example |
| 28 | 1.4 | 51 | 49 | 10 | 10 | 0.38 | 0.16 | 0.22 | 1244 | 3.7 | 3.1 | ○ | Example |
| 29 | 1.4 | 52 | 52 | 10 | 10 | 0.29 | 0.14 | 0.15 | 1278 | 3.2 | 2.7 | ◎ | Example |
| 30 | 1.4 | 49 | 51 | 11 | 11 | 0.51 | 0.22 | 0.29 | 1546 | 4.2 | 3.5 | ○ | Example |
| 31 | 1.4 | 56 | 50 | 11 | 10 | 0.48 | 0.18 | 0.30 | 1234 | 4.2 | 3.5 | ○ | Example |
| 32 | 1.4 | 54 | 55 | 10 | 11 | 0.47 | 0.18 | 0.29 | 1215 | 4.3 | 3.6 | ○ | Example |
| 33 | 1.4 | 50 | 50 | 11 | 10 | 0.45 | 0.18 | 0.27 | 1222 | 4.4 | 3.7 | ○ | Example |

TABLE 3-continued

Galvanized steel sheet

| | | (1) Coating weight | | (2) Zinc or zinc alloy-coated layer Fe content | | (3) Amount of Diffusive hydrogen (mass ppm) | | | | Resistance spot weldability | | | |
|---|---|---|---|---|---|---|---|---|---|---|---|---|---|
| No. | Sheet thickness t (mm) | First surface (g/m²) | Second surface (g/m²) | First surface (mass %) | Second surface (mass %) | Galvanized steel sheet (as a whole) | Base Steel sheet | Zinc or zinc alloy coating layer | (4) TS (MPa) | Min. nugget diameter D (mm) | D/√t | Evaluation | Remarks |
| 34 | 1.4 | 50 | 50 | 11 | 10 | 0.47 | 0.18 | 0.29 | 1234 | 4.4 | 3.7 | ○ | Example |
| 35 | 1.4 | 54 | 54 | 10 | 10 | 0.50 | 0.20 | 0.30 | 1221 | 4.5 | 3.8 | ○ | Example |
| 36 | 1.4 | 55 | 55 | 11 | 11 | 0.49 | 0.21 | 0.28 | 1241 | 4.4 | 3.7 | ○ | Example |
| 37 | 1.4 | 55 | 48 | 10 | 10 | 0.46 | 0.18 | 0.28 | 1345 | 4.3 | 3.6 | ○ | Example |
| 38 | 1.4 | 54 | 53 | 10 | 10 | 0.43 | 0.16 | 0.27 | 1521 | 4.1 | 3.5 | ○ | Example |
| 39 | 1.4 | 49 | 56 | 10 | 10 | 0.50 | 0.21 | 0.29 | 1267 | 4.5 | 3.8 | ○ | Example |
| 40 | 1.4 | 55 | 52 | 10 | 10 | 0.50 | 0.21 | 0.29 | 1198 | 4.4 | 3.7 | ○ | Example |
| 41 | 1.4 | 48 | 58 | 10 | 11 | 0.51 | 0.21 | 0.30 | 1310 | 4.5 | 3.8 | ○ | Example |
| 42 | 1.4 | 51 | 55 | 10 | 11 | 0.71 | 0.28 | 0.43 | 1201 | 5.4 | 4.6 | X | Comparative example |
| 43 | 1.4 | 50 | 55 | 10 | 11 | 0.63 | 0.18 | 0.45 | 1212 | 4.9 | 4.1 | X | Comparative example |
| 44 | 1.4 | 57 | 55 | 10 | 11 | 0.63 | 0.22 | 0.41 | 1215 | 5.0 | 4.2 | X | Comparative example |
| 45 | 1.4 | 53 | 54 | 10 | 11 | 0.66 | 0.22 | 0.44 | 1209 | 5.1 | 4.3 | X | Comparative example |
| 46 | 1.4 | 48 | 58 | 11 | 11 | 0.63 | 0.18 | 0.45 | 1207 | 5.0 | 4.2 | X | Comparative example |
| 47 | 1.4 | 48 | 58 | 11 | 11 | 0.47 | 0.18 | 0.29 | 1158 | 4.1 | 3.5 | ○ | Comparative example |
| 48 | 1.0 | 50 | 56 | 10 | 11 | 0.25 | 0.14 | 0.11 | 1211 | 2.8 | 2.8 | ◎ | Example |
| 49 | 2.0 | 50 | 56 | 10 | 11 | 0.24 | 0.13 | 0.11 | 1215 | 4.0 | 2.8 | ◎ | Example |

As illustrated in Table 3, all of the inventive examples had tensile strengths of 1160 MPa or more and excellent resistance spot weldability.

On the other hand, in the comparative examples, either a tensile strength of 1160 MPa or more was unobtainable or sufficient resistance spot weldability was unachievable.

The galvanized steel sheet according to the present disclosure has both high strength and excellent resistance spot weldability, and its application to the framework parts of automotive bodies, especially those around a cabin that affect crashworthiness of automobiles, contributes to improved safety performance and reduced automotive body weight due to the high strength and sheet metal thinning effect. As a result, the sheet can contribute to environmental aspects such as $CO_2$ emissions. The galvanized steel sheet according to the present disclosure can also be actively applied to suspension parts and other locations on automobiles where corrosion due to rain and snow is a concern and can be expected to improve performance in terms of rust and corrosion resistance of automotive bodies. Furthermore, the galvanized steel sheet according to the present disclosure can be applied not only to automotive parts, but also to fields of civil engineering, construction, and home appliances.

The invention claimed is:

1. A galvanized steel sheet having a base steel sheet and a zinc or zinc alloy coating layer on a surface of the base steel sheet, the base steel sheet comprising:
   a chemical composition containing, in mass %,
   C: 0.08% or more and 0.30% or less,
   Si: less than 2.0%,
   Mn: 1.5% or more and 3.5% or less,
   P: 0.010% or less,
   S: 0.010% or less,
   Al: 0.10% or less,
   N: 0.006% or less, and
   at least one of Ti, Nb, V and Zr: 0.02% or more and 0.20% or less in total, with the balance being Fe and inevitable impurities,
   wherein an amount of diffusible hydrogen in the zinc or zinc alloy coating layer is 0.40 mass ppm or less,
   a tensile strength of the galvanized steel sheet is 1160 MPa or more, and
   a coating weight of the zinc or zinc alloy coating layer is 48 g/m² to 120 g/m² per side.

2. The galvanized steel sheet according to claim 1, wherein the chemical composition of the base steel sheet further contains at least one of the following (1) to (3), in mass %,
   (1) one or more of Mo, Cr, Cu, and Ni: 0.5% or less in total,
   (2) B: 0.0050% or less,
   (3) one or both of Sb: 0.10% or less and Sn: 0.10% or less.

3. The galvanized steel sheet according to claim 1, wherein an amount of diffusible hydrogen in the galvanized steel sheet is 0.60 mass ppm or less.

4. The galvanized steel sheet according to claim 1, wherein the zinc or zinc alloy coating layer is a hot-dip galvanized layer or a galvannealed layer with an Fe content of 8 mass % to 15 mass %.

5. A method of producing a galvanized steel sheet, comprising:
   preparing a blank sheet having the chemical composition according to claim 1;
   then annealing the blank sheet at under a set of conditions including an annealing temperature of 750° C. to 870° C. and an atmosphere in a temperature range of 650° C. or more with a hydrogen concentration of 20 volume % or less;

then cooling the blank sheet to a holding temperature range of 450° C. to 550° C. and maintaining at the holding temperature range for 15 seconds or more; and then subjecting the blank sheet to a hot-dip galvanizing treatment under a set of conditions including a treatment atmosphere with a hydrogen concentration of 15 volume % or less.

6. The method of producing a galvanized steel sheet according to claim 5, wherein after the hot dip galvanizing treatment, an alloying treatment is performed.

7. The galvanized steel sheet according to claim 2, wherein an amount of diffusible hydrogen in the galvanized steel sheet is 0.60 mass ppm or less.

8. The galvanized steel sheet according to claim 2, wherein the zinc or zinc alloy coating layer is a hot-dip galvanized layer or a galvannealed layer with an Fe content of 8 mass % to 15 mass %.

9. The galvanized steel sheet according to claim 3, wherein the zinc or zinc alloy coating layer is a hot-dip galvanized layer or a galvannealed layer with an Fe content of 8 mass % to 15 mass %.

10. The galvanized steel sheet according to claim 7, wherein the zinc or zinc alloy coating layer is a hot-dip galvanized layer or a galvannealed layer with an Fe content of 8 mass % to 15 mass %.

11. A method of producing a galvanized steel sheet, comprising:

preparing a blank sheet having the chemical composition according to claim 2;

then annealing the blank sheet at under a set of conditions including an annealing temperature of 750° C. to 870° C. and an atmosphere in a temperature range of 650° C. or more with a hydrogen concentration of 20 volume % or less;

then cooling the blank sheet to a holding temperature range of 450° C. to 550° C. and maintaining at the holding temperature range for 15 seconds or more; and then subjecting the blank sheet to a hot-dip galvanizing treatment under a set of conditions including a treatment atmosphere with a hydrogen concentration of 15 volume % or less.

12. The method of producing a galvanized steel sheet according to claim 11, wherein after the hot dip galvanizing treatment, an alloying treatment is performed.

* * * * *